United States Patent
Han

(10) Patent No.: US 8,725,310 B2
(45) Date of Patent: May 13, 2014

(54) LASER DIODE BASED SELF-MIXING SENSOR FOR A VEHICLE ELECTRONIC STABILITY PROGRAM

(75) Inventor: Meng Han, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 221 days.

(21) Appl. No.: 13/318,159

(22) PCT Filed: Apr. 22, 2010

(86) PCT No.: PCT/IB2010/051763
§ 371 (c)(1),
(2), (4) Date: Oct. 31, 2011

(87) PCT Pub. No.: WO2010/125501
PCT Pub. Date: Nov. 4, 2010

(65) Prior Publication Data
US 2012/0053756 A1    Mar. 1, 2012

(30) Foreign Application Priority Data
Apr. 29, 2009 (EP) .................................. 09159067

(51) Int. Cl.
*G01S 17/58* (2006.01)
(52) U.S. Cl.
USPC .............................................. 701/1; 702/142
(58) Field of Classification Search
USPC .............................................. 701/1; 702/142
See application file for complete search history.

(56) References Cited

U.S. PATENT DOCUMENTS

| | | | |
|---|---|---|---|
| 5,475,620 A | | 12/1995 | Kuzuya et al. |
| 5,747,682 A | * | 5/1998 | Hirano ........................ 73/115.07 |
| 5,928,302 A | * | 7/1999 | Fukada ............................ 701/70 |
| 6,003,959 A | * | 12/1999 | Katayose et al. ............. 303/146 |
| 6,130,706 A | | 10/2000 | Hart, Jr. et al. |
| 6,671,595 B2 | | 12/2003 | Lu et al. |
| 6,671,605 B2 | * | 12/2003 | Ehret et al. ....................... 701/70 |
| 6,885,438 B2 | * | 4/2005 | Deines .......................... 356/28.5 |
| 7,085,641 B2 | * | 8/2006 | Post, II ............................ 701/70 |
| 7,315,773 B2 | * | 1/2008 | Kato et al. ....................... 701/41 |
| 7,372,395 B2 | * | 5/2008 | Kojima et al. ................. 342/104 |
| 8,306,697 B2 | * | 11/2012 | Lu et al. .......................... 701/38 |

(Continued)

FOREIGN PATENT DOCUMENTS

| | | |
|---|---|---|
| DE | 325639 | 9/1920 |
| DE | 3825639 A1 | 2/1990 |

(Continued)

OTHER PUBLICATIONS

EPO machine translation of WO 2009/022014 (original WO document published Feb. 19, 2009).*

(Continued)

*Primary Examiner* — Behrang Badii
*Assistant Examiner* — David Testardi
(74) *Attorney, Agent, or Firm* — Mark L. Beloborodov

(57) ABSTRACT

The invention is related to laser diode based self-mixing laser sensors for simplified vehicle stability control. Vehicle's side slip angle, front and rear tire slip angles, yaw rate and lateral acceleration rate are derived explicitly from self-mixing laser sensors. Three criteria based on yaw rate, turn radius and tire slip angle analysis are employed to detect the occurrence of understeer or oversteer, which enables simplified vehicle electronic stability program.

14 Claims, 2 Drawing Sheets

(56) References Cited

U.S. PATENT DOCUMENTS

| | | | |
|---|---|---|---|
| 8,363,211 B2* | 1/2013 | Groitzsch et al. | 356/5.01 |
| 2003/0130775 A1* | 7/2003 | Lu et al. | 701/36 |
| 2005/0201593 A1* | 9/2005 | Sawada et al. | 382/104 |
| 2012/0072073 A1* | 3/2012 | Groitzsch et al. | 701/41 |

FOREIGN PATENT DOCUMENTS

| | | | | |
|---|---|---|---|---|
| DE | 19923012 A1 | 11/2000 | | |
| DE | 102005004894 A1 | 8/2006 | | |
| DE | 102006022393 A1 | 11/2007 | | |
| DE | 102008038642 A1 | 2/2009 | | |
| DE | 102008038615 A1 | 3/2009 | | |
| WO | WO 2009/022014 A1 * | 2/2009 | | B60T 8/1755 |
| WO | WO 2009/037278 A1 * | 3/2009 | | G01S 17/32 |

OTHER PUBLICATIONS

EPO machine translation of WO 2009/037278 (original WO document published Mar. 26, 2009).*

Pruijmboom, Armand et al. "VCSEL-based miniature laser-doppler interferometer", Proc. SPIE 6908, Vertical-Cavity Surface-Emitting Lasers XII, paper 69080I, Jan. 29, 2008, 7 pages.*

Wikstrom, Anders, "Yaw Rate and Lateral Acceleration Sensor Plausibilisation in an Active Front Steering Vehicle", Master's Thesis, Linkoping University, Sweden, Nov. 9, 2006, downloaded from http://www.fs.isy.liu.se/Publications/MSc/06_EX_3818_AW.pdf.*

Stephant et al., "Linear observers for vehicle sideslip angle: experimental validation", May 2004, vol. 1, pp. 341-346.

* cited by examiner

LASER DIODE BASED SELF-MIXING SENSOR FOR A VEHICLE ELECTRONIC STABILITY PROGRAM

FIELD OF THE INVENTION

The invention generally concerns the measurement of vehicle dynamics. More specifically, the invention concerns an optical sensor for an electronic stability system.

BACKGROUND OF THE INVENTION

Vehicle stability is determined by the balance between tire traction force and vehicle's torque moment and centrifugal force. Breaking of vehicle stability limit results in a lateral slip of vehicles.

DE 3 825 639 A1 discloses an anti-skid system for motor vehicles which employ a laser Doppler sensor to detect a lateral drift of a car or its true speed over ground. However, critical conditions for vehicle stability can occur if the vehicle body side slip angle as well as the front and rear tire slip angles exceeds certain thresholds. None of these three parameters is yet available from current electronic stability program (ESP) sensor clusters.

OBJECT AND SUMMARY OF THE INVENTION

It is therefore an object of the invention to improve electronic stability control systems.

This object is solved by the subject matter of the independent claims. Advantageous refinements of the invention are defined in the dependent claims.

Vehicle's side slip angle, front and rear tire slip angles, yaw rate and lateral acceleration rate can be derived explicitly from self-mixing laser sensors of the device according to the invention.

Three criteria based on yaw rate, turn radius and tire slip angle analysis can be further employed to detect the occurrence of understeer or oversteer, which enables simplified vehicle electronic stability program.

For this purpose, an optical sensor device for determining vehicle dynamic conditions is provided, comprising
  a first laser device with at least one laser diode mounted on a vehicle at a first position so that the laser light impinges onto the road surface under an oblique angle, and
  a second laser device with at least one laser diode mounted on a vehicle at a second position so that the laser light impinges onto the road surface under an oblique angle, wherein the first and second position are laterally spaced along the road surface. The optical sensor device further comprises
  at least one detector for detecting self-mixing oscillations of the laser intensity of the laser diodes,
and
  a data processing device for calculating forward, lateral and/or vertical velocities from the self-mixing-laser intensity oscillations of each of the laser diodes, and for determining at least one of the parameters:
  the vehicle body side slip angle,
  a tire slip angle,
  a yaw rate of the vehicle,
  a pitch or roll rate of the vehicle.
  a turn radius, and
  an oversteer or understeer condition.

Conventional ESP requires inputs from at least four types of sensors, namely, steering angle sensor, lateral acceleration sensor, vehicle yaw rate sensor and wheel rotation sensor.

This invention is related to laser diode based, preferably VCSEL based self-mixing interference laser sensors which are able to explicitly measure vehicle body slip angle and tire slip angles. These parameters can not be explicitly measured with current ESP sensors.

Preferably, each laser device measures the longitudinal or forward velocity component, the lateral velocity component and/or the vertical velocity component. For this purpose, each laser device comprises at least two laser diodes, preferably VCSELs. The laser diodes are positioned so that the beams of the laser diodes are emitted from the laser device under different azimuthal angles so that the beams have a component of direction along the driving direction and vertically to the driving direction. As at least two beams are used which impinge on the raod surface under different azimuthal angles, the forward and lateral speed components can be extracted by the detector from the self-mixing oscillations of the laser diodes so that the data processing device is able to calculate the forward and lateral speed for each of the laser devices.

Laser self-mixing occurs if an external reflecting surface is arranged within the optical path of a laser so that an external cavity is obtained. Tuning of the external cavity results in a readjustment of the laser equilibrium conditions and thus to detectable changes in the laser output power. These changes, typically in form of undulations or oscillations are repetitive as a function of displacement of the external reflecting surface over a distance of a half laser wavelength. The undulation frequency thereby is proportional to the velocity of the external reflector.

It is further preferred to mount the first and second laser devices at different positions spaced apart along the forward direction of the vehicle. For example, one laser device may be mounted at the vehicle's front or its front axle and a further laser device is mounted at or near the vehicle's center of gravity or generally between the front and rear axles of the vehicle. As the sensitivity of the arrangement for certain parameters such as the yaw rate increases with the distance, it is preferred to mount the sensors at a distance of at least one fourth, particularly preferred at least one third of the distance between front and rear axle.

According to a further refinement, three laser devices spaced along the forward direction of the vehicle are employed. For example, one sensor may be mounted at or near the vehicle's front or front axle, a further laser device near the center of gravity or between the axles and the third laser device at the rear part of the vehicle or its rear axle.

If the lateral speeds for both laser devices can be calculated by the data processing device, the data processing device can further determine the yaw rate from the difference of the lateral speeds. Specifically, if a front axle steered vehicle is driving a turn at a given yaw rate, the front lateral speed is larger than the rear lateral speed. A difference in the lateral speeds will also occur if two laser devices are mounted at different positions transversally to the forward direction, e.g. on the left and on the right side of the vehicle.

According to a further refinement of the invention, one of the two or more laser devices and correspondingly the orientation of its laser beam is coupled to the front wheel travel direction. This can be achieved by mounting the laser device on a front wheel suspension. This arrangement allows for a direct determination of the front tire slip angle without the need for a steering angle sensor.

In this regard, it is advantageous to employ a laser device with two laser diodes so that one of the laser diodes emits a beam having a component of direction along the front wheel travel direction and the other of the laser diodes emits a beam having a component transversally to the wheel travel direction. Then, the data processing device can determine the speed $V_l$ along the wheel travel direction and the speed $V_t$ transversally to the wheel travel direction from the Doppler induced self-mixing oscillations of the laser intensity of both diodes. To determine the front tire slip angle $\alpha_f$, the following equation may then be calculated by the data processing device:

$$\alpha_f = \arctan(V_t/V_l)$$

According to a refinement of the invention, the data processing device is set up to determine the front tire slip angle or the rear tire slip angle from the vehicle's lateral speed, side slip angle and yaw rate. The calculation is explained in more detail below. The slip angles are important parameters to determine critical vehicle's dynamic conditions. Inter alia, the slip angles are related to understeer or oversteer condition. Specifically, the vehicle's rear tire slip angle $\alpha_r$ may be calculated by the data processing device according to the relations $$\alpha_r = \frac{b * d\Psi/dt}{V_x} - \beta,$$

wherein $V_x$ denotes the vehicle's forward speed, $d\Psi/dt$ denotes the vehicle's yaw rate and $\beta$ the vehicle's body slip angle. The body slip angle $\beta$ can be calculated by the data processing device using the relation $$\beta = \arctan(V_y/V_x),$$

wherein $V_y$ and $V_y^r$ denote the vehicle's lateral or transversal speed at the center and at the rear of the vehicle, respectively. The parameter b denotes the longitudinal distance between the laser devices. Preferably, a rear mounted laser device and a center mounted laser device, e.g. at the center of gravity, or more generally in longitudinal direction between the front and rear axles is used. In this case, the center and rear lateral velocities can be detected directly from the laser devices.

If the steering angle as a parameter is provided to the data processing device, e.g. by a separate steering angle sensor, furthermore, the front tire slip angle $\alpha_f$ of the vehicle can be calculated by the data processing device according to equations $$\alpha_f = \delta - \frac{a * d\Psi/dt}{V_x} - \beta, \text{ or } \alpha_f = \delta - \arctan\left(\frac{V_y^f}{V_x}\right)$$

wherein $V_x$ denotes the vehicle's forward speed and $\beta$ the vehicle's body slip angle.

$V_y$ and $V_y^f$ denote the vehicle's lateral speed detected by a center and a front mounted laser device, respectively. The center mounted laser device is generally mounted between the front and rear axles of the vehicle. Preferably, the center mounted laser device is mounted at or near the center of gravity (preferably at a longitudinal position that deviates less than 15 percent of the longitudinal axle distance from the center of gravity position) or near the half longitudinal distance between the axles (preferably at a longitudinal position that deviates less than 15 percent of the longitudinal axle distance from the half distance between the axles).

Similarly to the parameter b in the above equation for calculation of the rear tire slip angle, the parameter a denotes the longitudinal distance between the laser devices.

As discussed above, the vehicle's body side slip angle, front and rear tire slip angle, and yaw rate can be explicitly derived from the detection of the self-mixing oscillations detected by the detector.

Furthermore, the vehicle's turn radius may be calculated by the data processing device from the vehicle's yaw rate and the longitudinal or forward speed.

A further useful parameter for an electronic stability system for vehicles with a sensor device according to the invention is the lateral acceleration. According to a further refinement of the invention, the lateral acceleration rate at the vehicle's center of gravity can be determined by the data processing device by calculating the product of the longitudinal velocity or forward speed with the sum of the yaw rate and the rate of change of the side slip angle.

Three criteria based on yaw rate, turn radius and tire slip angle analysis may employed to detect the occurrence of understeer or oversteer and to determine whether brake intervention is needed. For this purpose, the data processing device may compare the magnitude of oversteer or understeer with a threshold value. The control of the electronic stability system may then induce a brake or a torque intervention on the basis of the comparison of the magnitude with the threshold value. Depending on the parameter representing the oversteer or understeer condition, the brake or a torque intervention may be induced either if the parameter exceeds or falls below the threshold value.

Specifically, an electronic stability system for vehicle according to a refinement of the invention may advantageously work as follows: The data processing device compares the actual vehicle's yaw rate with the yaw rate of neutral steering, the vehicle's actual turn radius with the Ackermann turn radius and the front tire slip angle with the rear tire slip angle. An understeer condition is detected by the data processing device if the actual vehicle's yaw rate is smaller than said yaw rate of neutral steering, the vehicle's actual turn radius is greater than the Ackermann turn radius and the front tire slip angle is larger than said rear tire slip angle. On the other hand, the data processing device detects an oversteer condition, if the actual vehicle's yaw rate is greater than said yaw rate of neutral steering, the vehicle's actual turn radius is smaller than said Ackermann turn radius and the front tire slip angle is smaller than said rear tire slip angle.

The foregoing and other objects, aspects and advantages of the present invention will be better understood from the following detailed description with reference to the drawings.

DETAILED DESCRIPTION OF EMBODIMENTS

Figure 1:
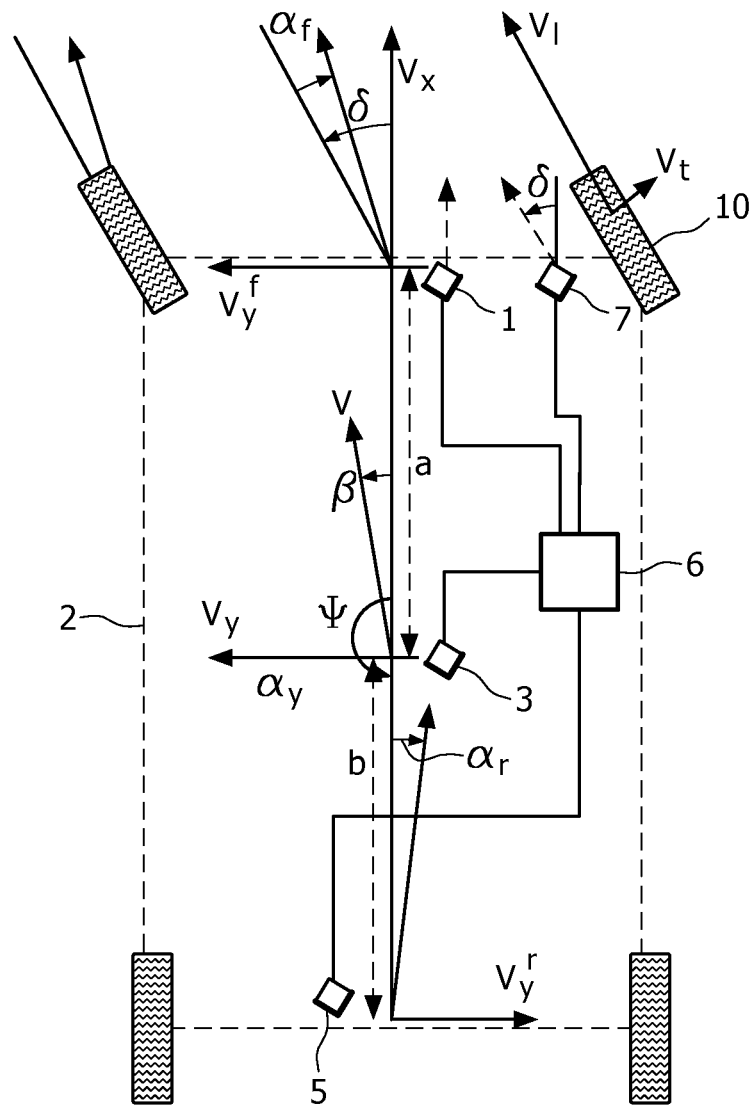
FIG. 1 shows a schematic of a vehicle with an optical sensor device for determining the vehicle's dynamic condition.

FIG. 1 shows a schematic of a vehicle 2 equipped with a vehicle stability control system (ESP) based on an optical sensor device with a multitude of laser devices. The laser light reflected or scattered from the road surface back along the laser beam into the respective cavity of the laser diodes is used for a measurement of the ground speed by means of self-mixing interference. As shown in FIG. 1, laser devices 1, 3, 5, 7 are mounted at different vehicle positions.

$V_x$ is the longitudinal vehicle speed. $V_y$, $V_y^f$ and $V_y^r$ are the lateral speed of center, front and rear mounted laser devices 3, 1 and 5, respectively. β denotes the vehicle body side slip angle. $\alpha_f$ and $\alpha_r$ are the front and rear tire slip angles, respectively.

For simplicity, parallel steering geometry is assumed. δ denotes the front tire steering angle. a and b are the distances between center mounted laser device 3 and front/rear mounted laser devices 1 and 5, respectively.

FIG. 1 shows an example with four laser devices 1, 3, 5, 7. However, the determination of vehicle's dynamic parameters for the stability control system may also be based on fewer laser devices. In any case, at least two laser devices are used.

For example, one of the laser devices 1 and 7 at the vehicle's front part may be omitted eventually. The sensing direction (dashed line) of laser device 1 is fixed to the vehicle longitudinal axis to measure longitudinal speed $V_x$ and transversal speed $V_y$.

The sensing direction of laser device 7 is fixed to the instantaneous tire pointing direction of front axle tire 10 to derive $V_t$ and $V_l$. $V_l$ is the wheel travel direction of tire 10 and $V_t$ is the transverse speed relative to the tire pointing or wheel travel direction, respectively.

The lateral slip of the vehicle 2 is characterized by body side slip angle β and tire slip angle α. As shown in FIG. 1, front tire slip angle $\alpha_f$ is defined as the angle between the tire pointing direction and actual tire travel direction, $$\alpha_f = \delta - \arctan\left(\frac{V_y^f}{V_x}\right), \tag{1}$$

where $V_x$ is the longitudinal speed, $V_y^f$ is the lateral speed of front and rear mounted laser devices 1, 5. δ denotes the front tire steering angle.

Conventional ESP sensor clusters typically comprise steering angle sensors which measure steer angle δ, acceleration sensors which measure the lateral acceleration rate and yaw rate sensors which detect the vehicle's yaw rate dΨ/dt.

However, although vehicle body side slip angle and tire slip angle are two of the most critical parameters of vehicle dynamics, none of these parameters can be explicitly derived with current ESP sensors.

This problem is overcome with the laser sensor device according to the invention. For this purpose, as illustrated in FIG. 1, at least two laser devices are mounted at different locations spaced apart along the vehicle's forward direction, or longitudinal direction, respectively. For example, one laser device 3 is mounted close to vehicle's center of gravity, another laser device is mounted near front or rear wheel base (i.e. laser devices 1 and 5). The distances between front and rear mounted laser devices 1, 5 to center mounted laser device 3 are denoted as a and b, respectively.

Each laser device measures both the lateral and longitudinal vehicle speed at corresponding mounting positions by means of at least one detector which detects the self-mixing laser intensity oscillations due to Doppler phase shift. For example, a detector may be integrated in each of the laser devices.

A data processing device 6 is connected to the laser devices and retrieves data corresponding to the detected self-mixing oscillations or the velocities resulting therefrom.

The vehicle body side slip angle β is derived by $$\beta = \arctan(V_y/V_x) \tag{2}$$

e.g. by evaluating the forward and lateral speeds $V_x$, $V_y$ measured from center mounted laser device 3.

The relationships between vehicle body side slip angle β, vehicle's lateral acceleration rate $a_y$ and tire slip angle α are expressed by:

$$d\beta/dt = \frac{a_y}{V_x} - d\Psi/dt, \text{ and} \tag{3}$$

$$\beta = \delta - \frac{a*d\Psi/dt}{V_x} - \alpha_f = \frac{b*d\Psi/dt}{V_x} - \alpha_r \tag{4}$$

The vehicle's yaw rate can be calculated by the data processing device in terms of the lateral speed gradient. For this purpose, the data processing device calculates the lateral speed for a pair of laser devices, e.g. devices 1 and 3 and the yaw rate from the difference of these lateral speeds.

To determine the yaw rate dΨ/dt, following relations may be evaluated by the data processing device according to:

$$\frac{d\Psi}{dt} = \frac{V_y^f - V_y}{a} = \frac{V_y - V_y^r}{b} \tag{5}$$

using the measured lateral speed $V_y^f$ measured from laser device 1, and the lateral speed $V_y$ from laser device 3, and/or using the measured lateral speed $V_y^r$ measured from laser device 5, and the lateral speed $V_y$ from laser device 3.

If the laser device comprises three or more laser diodes generating beams emitted under different azimuthal angles, vertical speed of vehicles besides forward and lateral speeds can be derived from the corresponding Doppler frequency vector.

To determine vehicle's pitch rate dθ/dt, following relations may be evaluated by the data processing device according to:

$$\frac{d\theta}{dt} = \frac{V_y^f - V_z}{a} = \frac{V_z - V_z^r}{b} \tag{6}$$

using the vehicle vertical speed $V_z^f$, $V_z$ and/or $V_z^r$ measured from laser devices 1, 3, 5, respectively. The parameter a denotes the distances between the front mounted laser device 1 and center mounted laser device 3. Similarly, parameter b is the distance between center mounted laser device 3 and rear mounted laser device 5.

Similarly, vehicle's roll rate can be derived from the vertical vehicle speed measured by laser devices which are spaced apart along the transverse axis of the vehicle, i.e. spaced apart transversally to the longitudinal or forward direction such as laser device 7 with respect to the other laser devices 1, 3, 5.

Once vehicle's side slip angle and yaw rate are known, both the front and rear tire slip angles $\alpha_f$ and $\alpha_r$ can be determined by the data processing device by evaluating the following equations already discussed above:

$$\alpha_r = \frac{b*d\psi/dt}{V_x} - \beta = \arctan(V_y^r/V_x), \text{ and,} \tag{7}$$

$$\alpha_f = \delta - \frac{a*d\psi/dt}{V_x} - \beta. \tag{8}$$

Further, using the speed over ground signals of the laterally spaced laser devices, the lateral acceleration rate can be determined. The lateral acceleration rate $a_y$ at the vehicle's center of gravity can be calculated by:

$$\alpha_y = V_x\left(\frac{d\psi}{dt} + \frac{d\beta}{dt}\right). \quad (9)$$

Accordingly, to determine the lateral acceleration rate, the data processing device adds the yaw rate calculated as discussed above and the rate of change of the side slip angle β and multiplies this sum with the longitudinal velocity obtained from any of laser devices 1, 3, 5. Thus, the lateral acceleration can be determined by the data processing device entirely on the basis of the optical speed over ground measurement without the need for a separate acceleration sensor.

Furthermore, if the yaw rate and the forward velocity are determined, the turn radius R of the vehicle 2 can be determined by the data processing device from these parameters. Specifically, the actual turn radius can be calculated according to the following relation:

$$R = \frac{V_x}{d\Psi/dt}. \quad (10)$$

Alternatively or in addition, the turn radius can also be determined from the lateral acceleration $\alpha_y$ and the forward speed $V_x$ according to the relation:

$$R = \frac{V_x^2}{a_y}. \quad (11)$$

Ideal vehicle turning without involving tire slip is described by Ackermann steering conditions, the corresponding yaw rate and Ackermann turn radius $R_A$ are determined by steering angle δ, $$d\Psi_A/dt = \frac{V_x\delta}{a+b}, \text{ and} \quad (12)$$

$$R_a = \frac{a+b}{\delta}. \quad (13)$$

However, actual turning generally involves both front and rear tire slip. When front tire slip angle is larger than rear tire slip angle, the vehicle is said understeer. When rear tire slip is larger than front tire slip angle, the vehicle is called oversteer. The primary task of vehicle stability control is to distinguish oversteer and understeer situations. Brake or torque interventions then will be taken to reduce the corresponding understeer or oversteer magnitude.

The optical sensor device with the multitude of at least two laser devices can precisely detect the occurrence of understeer and oversteer based on yaw rate, turn radius and tire slip angle analysis, as shown in the following. First, vehicle's actual yaw rate is compared with yaw rate of neutral steering. Second, vehicle's turn radius R is compared with Ackermann turn radius $R_A$. Third, the front tire slip angle is compared with the rear tire slip angle. Thus, the magnitude of oversteer or understeer can be explicitly derived from the laser devices. Accordingly, understeer and oversteer may be detected by the electronic stability system according to the following conditions:

a) an understeer is detected if the conditions $$d\Psi/dt < d\Psi_A/dt, R>R_A, \text{ and } \alpha_f>\alpha_r \text{ are fulfilled.} \quad (14)$$

b) an oversteer is detected if the conditions $$d\Psi/dt>d\Psi_A/dt, R<R_A, \text{ and } \alpha_f<\alpha_r \text{ are fulfilled.} \quad (15)$$

The magnitude of over- or understeer may, e.g., be calculated by weighted adding of the deviations of the actual dynamic parameters to the Ackermann dynamic parameters. Thus, for example the sum $$d*(d\Psi/dt-d\Psi_A/dt)+e*(R_a-R)+f*(\alpha_r-\alpha_f) \quad (16)$$

may be calculated, where d, e, f are weighting factors. The result then may be compared to threshold values for oversteer and understeer.

In case that the magnitude of understeer or oversteer exceeds a threshold value, then the electronic stability system will initiate brake interventions to keep the vehicle under control.

Alternatively or in addition to laser device 1, a laser device 7 may be employed which dynamically rotates according to the instantaneous steering angle. In other words, the orientation of the laser device 7 is coupled to the wheel travel direction of one of the front axle tires 10. In order to couple the sensing direction of laser device 7 to the actual tire pointing direction, the laser device may be mounted at the wheel suspension.

In this case, as shown in the following equation, the front tire slip angle $\alpha_f$ can be determined explicitly by the longitudinal speed in tire pointing direction $V_l$ and the transverse speed $V_t$. A laser device mounted this way can also replace a conventional steering angle sensor.

Using the lateral and longitudinal speeds obtained from laser device 7, the front tire slip angle $\alpha_f$ can be simply calculated according to equation $$\alpha_f=\arctan(V_t/V_l). \quad (17)$$

Figure 2:
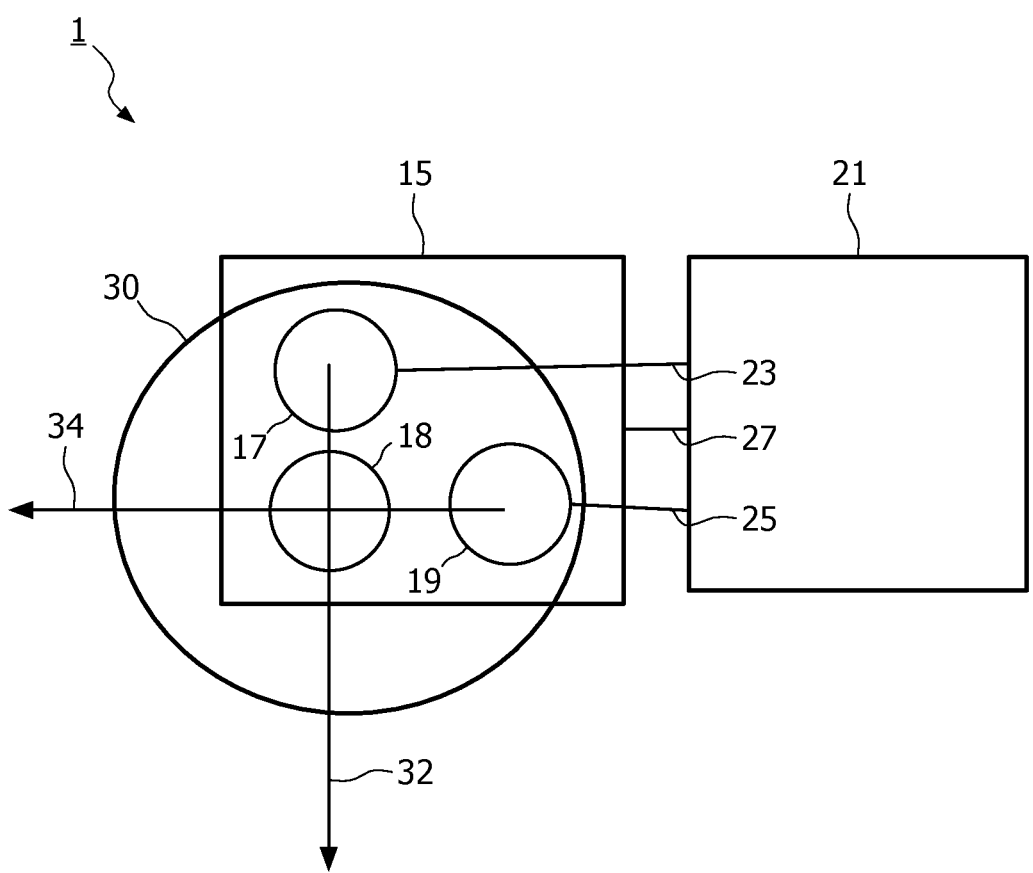
FIG. 2 shows details of a laser device.

To determine the respective lateral and longitudinal speeds at the location of the laser devices, all laser devices employed preferably comprise at least two laser diodes which emit beams under different azimuthal angles, whereby the azimuthal angles refer to a rotation about the perpendicular of the road surfaces. FIG. 2 shows an example of a laser device 1 in more detail.

The laser device 1 comprises a chip 15 with two VCSELs 17, 19 thereon, formed as mesa structures on the chip substrate. The VCSELs are thus emitting in a direction vertically to the chip surface. Each of the VCSELs 15, 17 comprises an integrated monitor photodiode.

Exemplary, in this embodiment, the detector for detecting self-mixing intensity oscillations is integrated into the laser device 1. The detector comprises the photodiodes and a detector circuitry 21 connected to the photodiodes via lines 23, 25 and common line 27. Common line 27 is connected to the backside of the substrate of the chip 15 opposite to the side with the mesa structures. A deflecting structure is provided which deflects the laser beams 32, 24 of the VCSELs so that both beams have a component of direction vertically to the optical axes of the VCSELs 17, 19. As an example, a lens 30 acting as deflecting element is mounted on chip 15. The lens 15 is placed with its central axis off-centered with respect to the optical axes of VCSELs 17, 19. Due to this placement, the beams are somewhat deflected towards the chip surface. As seen in the top view of FIG. 2, the beams are deflected so that the vertical components of the beams 32, 34 are non-parallel. In other words, the beams are emitted under different azimuthal angles.

Specifically, in the embodiment of FIG. 2, the transversal components of beams 32, 34 include a right angle. Thus, if the laser device is mounted onto the vehicle with the VCSELs 17, 19 facing the road surface, the device can be oriented so that one laser beam, e.g. beam 34 has its transversal component along the forward direction (i.e. along $V_x$) and the other beam has its transversal component laterally to the forward direction (i.e. along $V_y$). In case of laser device 7, one laser beam, e.g. beam 34 has a transversal component along the wheel travel direction $V_l$ and the other beam has a component along $V_t$.

Further, as a refinement, a third laser diode 18 may be integrated on chip 15 generating a further beam which allows to discriminate a vertical velocity component from lateral and longitudinal speeds. For example, the beam of the further laser diode is emitted under a different azimuthal angle with respect to the other beams 32. Alternatively, the beam may be emitted vertically to the road surface so that the Doppler signal derived from this laser diode 18 directly corresponds to a vertical velocity of the vehicle body with respect to the road surface. As described above, the vertical velocity can be used to determine the pitch and/or roll rate.

The detector circuitry 21 is connected to the data processing device. The data generated by the detector circuitry 21 and transmitted to the data processing device 6 may be the processed and amplified oscillation signal. Alternatively, the detector circuitry may process a signal corresponding to the velocity (e.g. by a frequency to voltage converter) and transmit this signal.

Although preferred embodiments of the present invention have been illustrated in the accompanying drawings and described in the foregoing description, it will be understood that the invention is not limited to the embodiments disclosed but is capable of numerous modifications without departing from the scope of the invention as set out in the following claims.

The invention claimed is:

1. An optical sensor device for determining vehicle dynamic conditions, comprising
 a first laser device with at least one laser diode mounted on a vehicle at a first position so that the laser light impinges onto the road surface under a first oblique angle, and
 a second laser device with at least one laser diode mounted on a vehicle at a second position so that the laser light impinges onto the road surface under a second oblique angle, wherein said first and said second position are transversely spaced along the road surface,
 at least one detector for detecting self-mixing oscillations of the laser intensity of said laser diodes, and
 a data processing device for calculating forward, transverse or vertical velocities from the self-mixing-laser intensity oscillations of each of said laser diodes, and for determining at least one of the parameters selected from the group consisting of a vehicle body side slip angle, a tire slip angle, a yaw rate of said vehicle, a pitch or a roll rate of said vehicle, a turn radius, and an oversteer or understeer condition
wherein one of said laser devices is mounted on a front wheel suspension so that the laser beam orientation is coupled to the front wheel travel direction.

2. The optical sensor device according to claim 1, wherein each laser device comprises at least two laser diodes, and wherein the beams of said laser diodes are emitted from said laser device under different azimuthal angles and have a component of direction along the driving direction and vertically to the driving direction, and whereby said data processing device is set up to calculate the forward, transverse or vertical speed for each of said laser devices.

3. The optical sensor device according to claim 1, comprising two or three laser devices spaced along the forward direction of the vehicle.

4. The optical sensor device according to claim 3, wherein said data processing device calculates the forward, transverse or vertical speed for each of said laser devices and at least one of the yaw rate from the difference of the transverse speeds and the pitch or roll rate from the difference of the vertical speeds, according to at least one of the following equations:

$$\frac{d\Psi}{dt} = \frac{V_y^f - V_y}{a}; \quad \frac{d\psi}{dt} = \frac{V_y - V_y^r}{b};$$
$$\frac{d\theta}{dt} = \frac{V_z^f - V_z}{a}; \quad \text{and} \quad \frac{d\theta}{dt} = \frac{V_z - V_z^r}{b}$$

wherein $V_y$, $V_y^f$ and $V_y^r$ denote the vehicle's transverse speed detected by a center, a front and a rear mounted laser device, respectively, $V_z$, $V_z^f$ and $V_z^r$ denote the vehicle's vertical speed detected by said center, front and rear mounted laser device, respectively, a denotes the longitudinal distance between said front and said center mounted laser device, and b denotes the longitudinal distance between said center mounted and said rear mounted laser device.

5. The optical sensor according to claim 1, wherein said data processing device determines the front tire slip angle or the rear tire slip angle from the vehicle's transverse speed, side slip angle and yaw rate.

6. The optical sensor device according to claim 1, wherein said laser device is mounted on a front wheel suspension and comprises two laser diodes, one of said laser diodes emitting a beam having a component of direction along the front wheel travel direction and the other of said laser diodes emitting a beam having a component transversally to said wheel travel direction, whereby said data processing device determines the speed $V_l$ along the wheel travel direction and the speed $V_t$ transversally to the wheel travel direction and calculates a front tire slip angle according to the equation $\alpha_f = \arctan(V_t/V_l)$.

7. The optical sensor according to claim 1, wherein said data processing device determines the transverse acceleration rate at the vehicle's center of gravity by calculating the product of the longitudinal velocity or forward speed with the sum of the yaw rate and the rate of change of the side slip angle.

8. The optical sensor according to claim 1, wherein said data processing device determines the vehicle's turn radius from the vehicle's yaw rate and its forward speed.

9. An electronic stability system for vehicles, comprising a sensor device according to claim 1.

10. The electronic stability system for vehicles according to claim 9, wherein said electronic stability system comprises a control which induces a brake or a torque intervention based on satisfaction by oversteer or understeer of a threshold, as determined by the data processing device.

11. The electronic stability system for vehicle's according to claim 10, wherein said data processing device compares the actual vehicle's yaw rate with the yaw rate of neutral steering, the vehicle's actual turn radius with the Ackermann turn radius and the front tire slip angle with the rear tire slip angle, and wherein
 said data processing device detects an understeer condition if said actual vehicle's yaw rate is smaller than said yaw rate of neutral steering, said vehicle's actual turn radius is greater than said Ackermann turn radius and said front tire slip angle is larger than said rear tire slip angle, and wherein said data processing device detects an oversteer condition, if said actual vehicle's yaw rate is greater than said yaw rate of neutral steering, said vehicle's actual turn radius is smaller than said Ackermann turn radius and said front tire slip angle is smaller than said rear tire slip angle.

12. The optical sensor according to claim 1, wherein said data processing device calculates the vehicle's rear tire slip angle $\alpha_r$ according to the equations $$\alpha_r = \frac{b \times \frac{d\psi}{dt}}{V_x} - \beta \text{ and } \alpha_r \arctan\left(\frac{V_y^r}{V_x}\right)$$

wherein $V_x$ denotes the vehicle's forward speed, b denotes the longitudinal distance between said first and said second laser device and $\beta$ the vehicle's body slip angle, said body slip angle being calculated by said data processing device (6) from the relation $$\beta = \arctan\left(\frac{V_y}{V_x}\right),$$

wherein $V_y$ and $V_y^r$ denote the vehicle's transverse speed detected by a center and a rear mounted laser device, respectively, and $$\frac{d\Psi}{dt}$$

denotes the vehicle's yaw rate.

13. The optical sensor device according to claim 1, wherein a front tire slip angle $\alpha_f$ of said vehicle is calculated by said data processing device according to equations $$\alpha_f = \delta - \frac{a \times \frac{d\psi}{dt}}{V_x} - \beta \text{ and } \alpha_f = \delta - \arctan\left(\frac{V_y^f}{V_x}\right)$$

wherein $V_x$ denotes the vehicle's forward speed, $V_y$ and $V_y^f$ denote the vehicle's transverse speed detected by a center and a front mounted laser device, respectively, a denotes the longitudinal distance between said center and said front mounted laser device and $\beta$ denotes the vehicle's body slip angle, said body slip angle being calculated by said data processing device from the relation $$\beta = \arctan\left(\frac{V_y}{V_x}\right), \text{ and } \frac{d\Psi}{dt}$$

denotes the vehicle's yaw rate, and wherein $\delta$ denotes the steering angle.

14. An optical sensor device for determining vehicle dynamic conditions, comprising:
a first laser device with at least one laser diode mounted on a vehicle at a first position so that the laser light impinges onto the road surface under a first oblique angle;
a second laser device with at least one laser diode mounted on a vehicle at a second position so that the laser light impinges onto the road surface under a second oblique angle, wherein said first and said second position are transversely spaced along the road surface;
at least one detector for detecting self-mixing oscillations of the laser intensity of said laser diodes; and
a data processing device for calculating forward, transverse or vertical velocities from the self-mixing-laser intensity oscillations of each of said laser diodes, and for determining at least one of the parameters selected from the group consisting of a vehicle body side slip angle, a tire slip angle, a yaw rate of said vehicle, a pitch or a roll rate of said vehicle, a turn radius, and an oversteer or understeer condition;
wherein one of said laser devices is mounted on a front wheel suspension so that the laser beam orientation is coupled to the front wheel travel direction and comprises two laser diodes, one of said laser diodes emitting a beam having a component of direction along the front wheel travel direction and the other of said laser diodes emitting a beam having a component transversally to said wheel travel direction, whereby said data processing device calculates a front tire slip angle based on the speed $V_l$ along the wheel travel direction and the speed $V_t$ transversally to the wheel travel direction.

* * * * *